US012591124B2

(12) United States Patent
Kusui et al.

(10) Patent No.: US 12,591,124 B2
(45) Date of Patent: Mar. 31, 2026

(54) MICROSCOPE OPTICAL SYSTEM, MICROSCOPE DEVICE, AND IMAGE FORMATION LENS

(71) Applicant: NIKON CORPORATION, Tokyo (JP)

(72) Inventors: Yuta Kusui, Kamakura (JP); Kazuhiro Takasago, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 619 days.

(21) Appl. No.: 17/919,401

(22) PCT Filed: Apr. 13, 2021

(86) PCT No.: PCT/JP2021/015353
§ 371 (c)(1),
(2) Date: Oct. 17, 2022

(87) PCT Pub. No.: WO2021/215312
PCT Pub. Date: Oct. 28, 2021

(65) Prior Publication Data
US 2023/0152564 A1      May 18, 2023

(30) Foreign Application Priority Data

Apr. 20, 2020      (JP) ................................. 2020-074552

(51) Int. Cl.
| *G02B 21/02* | (2006.01) |
| *G01N 21/64* | (2006.01) |
| *G02B 9/12* | (2006.01) |

(52) U.S. Cl.
CPC ......... *G02B 21/02* (2013.01); *G01N 21/6458* (2013.01); *G02B 9/12* (2013.01)

(58) Field of Classification Search
CPC ....... G02B 21/02; G02B 9/12; G01N 21/6458
See application file for complete search history.

(56) References Cited

U.S. PATENT DOCUMENTS

| 2010/0214402 A1 | 8/2010 | Schute et al. |
| 2016/0103308 A1 | 4/2016 | Furuya |
(Continued)

FOREIGN PATENT DOCUMENTS

| CN | 110554494 A | * 12/2019 | ......... G02B 13/0015 |
| JP | S63-311222 A | 12/1988 | |
(Continued)

OTHER PUBLICATIONS

Zhang, Yueqian, et al. "Systematic design of microscope objectives. Part I: System review and analysis," Advanced Optical Technologies May 14, 2019, De Gruyter, vol. 8 No. 5, pp. 313-347. (Year: 2019).*

(Continued)

*Primary Examiner* — Nathanael R Briggs

(57) ABSTRACT

This microscope optical system comprises an objective lens that collimates light from an object, and an image formation lens (IL) that forms an image of light from the objective lens. The image formation lens (IL) comprises a first lens group (G1) having a cemented lens (CL11), a second lens group (G2) having positive refractive power, and a third lens group (G3) having negative refractive power, which are arranged in order from the object side, and satisfies the following conditional expression. $0.1 < \Phi en/f < 0.2$ where $\Phi en$ is the pupil diameter of the objective lens, and f is the focal length of the image formation lens (IL).

9 Claims, 14 Drawing Sheets

(56) References Cited

U.S. PATENT DOCUMENTS

| | | |
|---|---|---|
| 2017/0227751 A1 | 8/2017 | Furuya |
| 2019/0324259 A1 | 10/2019 | Abe et al. |

FOREIGN PATENT DOCUMENTS

| | | |
|---|---|---|
| JP | 2006-119300 A | 5/2006 |
| JP | 2016-075860 A | 5/2016 |

OTHER PUBLICATIONS

Japanese Office Action dated Jul. 25, 2023 for counterpart Japanese Application No. 2022-516981.

International Search Report, dated Jun. 22, 2021, in International Patent Application No. PCT/JP2021/015353 (4 pp.).

Written Opinion, dated Nov. 3, 2022, in corresponding International Application No. PCT/JP2021/015353 (10 pp.).

Extended European Search Report dated Apr. 9, 2024 for European Application No. 21793789.5.

Zhang Yueqian et al: "Systematic design of microscope objectives. PartI: System review and analysis", Advanced Optical Technologies, vol. 8, No. 5, May 14, 2019 (May 14, 2019), pp. 313-347, XP093144698, DOI: 10.1515/aot-2019-0002.

Anonymous: "Properties of Microscope Objectives I MicroscopyU", Apr. 17, 2020 (Apr. 17, 2020), XP093144535, Retrieved from the Internet: URL:https://web.archive.org/web/20200417061918/https://www.microscopyu.com/microscopy-basics/properties-of-microscopeobjectives [retrieved on Mar. 22, 2024].

Japanese Office Action dated Apr. 4, 2023 for Japanese Application No.

\* cited by examiner

MICROSCOPE OPTICAL SYSTEM, MICROSCOPE DEVICE, AND IMAGE FORMATION LENS

CROSS REFERENCE TO RELATED APPLICATIONS

This application is a U.S. National Stage Application which claims the benefit under 35 U.S.C. § 371 of International Patent Application No. PCT/JP2021/015353 filed on Apr. 13, 2021, which claims priority benefit from Japanese Patent Application No. 2020-074552 filed on Apr. 20, 2020, the contents of each of which are incorporated herein by reference.

TECHNICAL FIELD

The present invention relates to microscope optical systems, microscope devices, and image formation lenses.

TECHNICAL BACKGROUND

In recent years, there have been proposed various kinds of image formation lenses for microscopes, adapted to objective lenses having a wide field of view (for example, refer to Patent literature 1). Such image formation lenses are required to have high resolution while keeping a wide field of view.

PRIOR ARTS LIST

Patent Document

Patent literature Japanese Laid-Open Patent Publication No. 2016-75860(A)

SUMMARY OF THE INVENTION

A microscope optical system according to the present invention comprises: an objective lens that converts light from an object into parallel light; and an image formation lens that forms an image from the light from the objective lens, wherein the image formation lens comprises, in order from the object side, a first lens group including a cemented lens, a second lens group having positive refractive power, and a third lens group having negative refractive power, and the following conditional expression is satisfied:

$$0.1 < \Phi en/f < 0.2,$$

where $\Phi en$: the pupil diameter of the objective lens, and f: the focal length of the image formation lens.

A microscope device according to the present invention comprises the above the microscope optical system.

An image formation lens according to the present invention is an image formation lens for a microscope, the image formation lens forming an image from light from an objective lens, the image formation lens comprising, in order from the object side: a first lens group including a cemented lens; a second lens group having positive refractive power; and a third lens group having negative refractive power, wherein the following conditional expression is satisfied:

$$0.1 < \Phi en/f < 0.2,$$

where $\Phi en$: the pupil diameter of the objective lens, and f: the focal length of the image formation lens.

BRIEF DESCRIPTION OF THE DRAWINGS

FIG. 5 is a cross-sectional diagram showing the configuration of an image formation lens according to a second example;

FIG. 7 is a cross-sectional diagram showing the configuration of an image formation lens according to a third example;

FIG. 13 is a cross-sectional diagram showing the configuration of an image formation lens according to a sixth example.

DESCRIPTION OF THE EMBODIMENTS

Hereinafter, a microscope optical system, microscope device, and image formation lens of the present embodiment will be described with reference to the figures. The present embodiment describes an image formation lens, microscope optical system, and microscope device having a wide field of view and high resolution.

Figure 1:
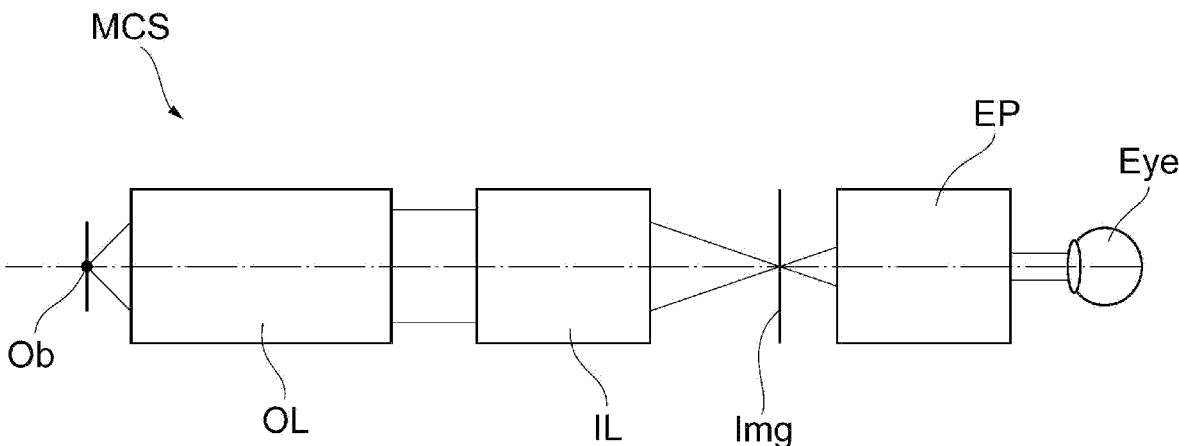
FIG. 1 is a schematic configuration diagram showing a microscope optical system according to the present embodiment.

First, a microscope optical system according to the present embodiment will be described. As shown in FIG. 1, a microscope optical system MCS according to the present embodiment comprises, in order from the object side, an objective lens OL and an image formation lens IL. The objective lens OL converts light from an object Ob into parallel light. The image formation lens IL collects light from the objective lens OL and forms an image of the object Ob on an image surface Img. The image of this object Ob is observed by the observer' eye Eye through an eyepiece EP. Note that in FIG. 1, the object Ob is an object point on the optical axis. The image of the object Ob may be formed not only through the eyepiece EP, but it may be formed again on a second image surface where an image sensor (not shown) is located, for example, by using a relay lens (not shown).

Next, the image formation lens of the microscope optical system according to the present embodiment will be described. As an example of the image formation lens IL, an image formation lens IL(1) shown in FIG. 3 comprises, in order from the object side along the optical axis, a first lens group G1 including a cemented lens CL11, a second lens group G2 having positive refractive power, and a third lens group G3 having negative refracture power. Note that the entrance pupil surface Pu of the image formation lens IL(1) corresponds to the exit pupil surface of an infinity-corrected objective lens OL.

In the microscope optical system MCS according to the present embodiment, the image formation lens IL satisfies the following conditional expression (1):

$$0.1 < \Phi en/f < 0.2 \tag{1},$$

where $\Phi en$: the pupil diameter of the objective lens OL, and f: the focal length of the image formation lens IL.

In the present embodiment, by satisfying conditional expression (1), it is possible to provide an image formation lens and microscope optical system having a wide field of view and high resolution. In the microscope optical system MCS according to the present embodiment, the image formation lens IL may be an image formation lens IL(2) shown in FIG. 5, an image formation lens IL(3) shown in FIG. 7, or an image formation lens IL(4) shown in FIG. 9. In the microscope optical system MCS according to the present embodiment, the image formation lens IL may also be an image formation lens IL(5) shown in FIG. 11 or an image formation lens IL(6) shown in FIG. 13. In the microscope optical system MCS according to the present embodiment, the configuration of the image formation lens IL may be such that the image formation lens IL consists of, in order from the object side along the optical axis, the first lens group G1 including the cemented lens CL11, the second lens group G2 having positive refractive power, and the third lens group G3 having negative refractive power, that the air distance between the first lens group G1 and the second lens group G2 is largest in the image formation lens IL, and that the third lens group G3 consists of one cemented lens CL31.

Conditional expression (1) defines the relationship between the pupil diameter (exit pupil diameter) of the objective lens OL and the focal length of the image formation lens IL. If the corresponding value of conditional expression (1) is smaller than the lower limit, the components, out of the light from the objective lens OL, having large numerical aperture NA are restricted. Thus, it is difficult to make the numerical aperture NA of the image formation lens IL larger to make it adapted to the objective lens OL having a wide field of view, making it difficult to provide high resolution while keeping a wide field of view. To ensure the effects of the present embodiment, the lower limit of conditional expression (1) may preferably be 0.15. If the corresponding value of conditional expression (1) is larger than the upper limit, the aperture is large, and this increases the amount of aberration, making it difficult to correct aberration to achieve high-resolution images. To ensure the effects of the present embodiment, the upper limit of conditional expression (1) may preferably be 0.18.

In the microscope optical system MCS according to the present embodiment, the image formation lens IL may satisfy the following conditional expression (2):

$$35\ [\text{mm}] < (\Phi en \times \Phi 1max)/\Phi im < 120\ [\text{mm}] \tag{2},$$

where $\Phi 1max$: the effective diameter of the lens having the largest effective diameter in the first lens group G1, and $\Phi im$: the diameter of the image circle in which the light from the image formation lens IL forms an image.

Conditional expression (2) defines the relationship between the pupil diameter of the objective lens OL, the effective diameter of the lens with the largest effective diameter in the first lens group G1, and the diameter of the image circle. To provide an image formation lens and microscope optical system having a wide field of view and high resolution, it is necessary to increase the numerical aperture NA of the image formation lens to make it adapted to the objective lens having a wide field of view. By satisfying conditional expression (2), it is possible to favorably correct the aberration that occurs as the numerical aperture NA of the image formation lens increases, while keeping a wide field of view.

If the corresponding value of conditional expression (2) is smaller than the lower limit, the image formation lens IL forms an image on the image surface Img, using only part of the light from the objective lens OL. Thus, the amount of light in the periphery of the field of view is small, making it difficult to correct the off-axis aberration such as the coma aberration. To ensure the effects of the present embodiment, the lower limit of conditional expression (2) may preferably be 65 [mm]. If the corresponding value of conditional expression (2) is larger than the upper limit, to achieve a wide field of view, the size of the lens needs to be larger, making the production difficult. To ensure the effects of the present embodiment, the upper limit of conditional expression (2) may preferably be 90 [mm].

In the microscope optical system MCS according to the present embodiment, the cemented lens CL11 of the first lens group G1 may comprise a first positive lens and a negative lens joined to the first positive lens, the first lens group G1 or the second lens group G2 may comprise a second positive lens, and the image formation lens IL may satisfy the following conditional expression (3):

$$vdp2 < vdn < vdp1 \tag{3},$$

where $vdp1$: the Abbe number of the first positive lens, $vdp2$: the Abbe number of the second positive lens, and $vdn$: the Abbe number of the negative lens.

Conditional expression (3) defines the relationship between the dispersion (Abbe number) of the first positive lens and the dispersion (Abbe number) of the negative lens in the cemented lens CL11 of the first lens group G1 and the dispersion of the second positive lens located in the first lens group G1 or the second lens group G2. By satisfying conditional expression (3), it is possible to favorably correct the longitudinal chromatic aberration and the second-order chromatic aberration.

In the microscope optical system MCS according to the present embodiment, the first positive lens may satisfy the following conditional expression (4):

$$70 < vdp1 \tag{4}.$$

Conditional expression (4) defines an appropriate range of the dispersion (Abbe number) of the first positive lens. By satisfying conditional expression (4), it is possible to favorably correct the longitudinal chromatic aberration. If the corresponding value of conditional expression (4) is smaller than the lower limit, it is difficult to correct the longitudinal chromatic aberration. To ensure the effects of the present embodiment, the lower limit of conditional expression (4) may preferably be smaller than 80.

In the microscope optical system MCS according to the present embodiment, the second positive lens may satisfy the following conditional expression (5):

$$vdp2 < 45 \tag{5}.$$

Conditional expression (5) defines an appropriate range of the dispersion (Abbe number) of the second positive lens. By satisfying conditional expression (5), it is possible to favorably correct the second-order chromatic aberration. If the corresponding value of conditional expression (5) is higher than the upper limit, it is difficult to correct the second-order chromatic aberration. To ensure the effects of the present embodiment, the upper limit of conditional expression (5) may preferably be 42. In addition, to ensure the effects of the present embodiment, the lower limit of conditional expression (5) may preferably be larger than 15.

In the microscope optical system MCS according to the present embodiment, the image formation lens IL may satisfy the following conditional expression (6):

$$1.0 < |f1|/f \tag{6}$$

where f1: the focal length of the first lens group G1.

Conditional expression (6) defines the relationship between the focal length of the first lens group G1 and the focal length of the image formation lens IL, By satisfying conditional expression (6), it is possible to favorably correct the off-axis aberration such as the field curves and the coma aberration. If the corresponding value of conditional expression (6) is smaller than the lower limit, the power of the first lens group G1 is too high, and this would cause higher-order off-axis aberration. To ensure the effects of the present embodiment, the lower limit of conditional expression (6) may preferably be 1.2. In addition, to ensure the effects of the present embodiment, the upper limit of conditional expression (6) may preferably be smaller than 4.0.

In the microscope optical system MCS according to the present embodiment, the image formation lens IL may satisfy the following conditional expression (7):

$$1.0 < h2/h1 \tag{7}$$

where h1: the height of a principal ray that enters the first lens group G1, and
h2: the height of the principal ray that enters the second lens group G2.

Conditional expression (7) defines the relationship between the height of the principal ray that enters the first lens group G1 and the height of the principal ray that enters the second lens group G2. Note that the principal ray is the ray that passes through the center of the entrance pupil of the image formation lens (the exit pupil of the objective lens). By satisfying conditional expression (7), it is possible to favorably correct the chromatic aberration. If the corresponding value of conditional expression (7) is smaller than the lower limit, the effects of correcting chromatic aberration of magnification by the lens on an image side of the second lens group G2 is small, making it difficult to correct the chromatic aberration. To ensure the effects of the present embodiment, the lower limit of conditional expression (7) may preferably be 1.2. In addition, to ensure the effects of the present embodiment, the upper limit of conditional expression (7) may preferably be smaller than 2.0.

In the microscope optical system MCS according to the present embodiment, the image formation lens IL may satisfy the following conditional expression (8):

$$0.7 < TL/f \tag{8}$$

where TL: the entire length of the image formation lens IL.

Conditional expression (8) defines the relationship between the entire length of the image formation lens IL and the focal length of the image formation lens IL. Note that the entire length of the image formation lens IL means the distance on the optical axis from the apex of the lens surface closest to the object in the image formation lens IL to the image surface of the image formation lens IL. By satisfying conditional expression (8), it is possible to favorably correct the off-axis aberration such as the field curves. If the corresponding value of conditional expression (8) is smaller than the lower limit, higher-order off-axis aberration would occur, making it difficult to correct the field curves. To ensure the effects of the present embodiment, the lower limit of conditional expression (8) may preferably be 1.1. In addition, to ensure the effects of the present embodiment, the upper limit of conditional expression (8) may preferably be smaller than 2.0.

Next, a microscope device according to the present embodiment will be described. As an example of a microscope device, a fluorescence microscope 100 will be described with reference to FIG. 2. The fluorescence microscope 100 comprises a stage 101, a light source 111, an illumination optical system 121, a microscope optical system 131, an eyepiece 141, and an imaging device 151. On the stage 101 is placed, for example, a sample SA held between a microscope slide (not shown) and a cover glass (not shown). The sample SA placed on the stage 101 may be contained together with immersion liquid in a sample container (not shown). The sample SA includes fluorescent substances such as a fluorescent dye. The sample SA is, for example, cells fluorescently stained in advance or the like.

The light source 111 generates excitation light in a specified wavelength band. The specified wavelength band is set to a wavelength band that enables excitation of the sample SA including fluorescent substances. The excitation light emitted from the light source 111 enters the illumination optical system 121.

The illumination optical system 121 illuminates the sample SA on the stage 101 with the excitation light emitted from the light source 111. The illumination optical system 121 comprises a collimator lens 122 and a dichroic mirror 124 in order from the light source 111 side toward the sample SA side. The illumination optical system 121 comprises an objective lens 132 which is also included in the microscope optical system 131. The collimator lens 122 collimates the excitation light emitted from the light source 111.

The dichroic mirror 124 has characteristics of reflecting the excitation light from the light source 111 and transmitting the fluorescence from the sample SA. The dichroic mirror 124 reflects the excitation light from the light source 111 toward the sample SA on the stage 101. The dichroic mirror 124 transmits fluorescence generated at the sample SA toward a mirror 133 of the microscope optical system 131. Between the dichroic mirror 124 and the collimator lens 122 is arranged an excitation filter 123 that transmits the excitation light from the light source 111. Between the dichroic mirror 124 and the mirror 133 is arranged a fluorescence filter 125 that transmits the fluorescence from the sample SA.

The microscope optical system 131 comprises the objective lens 132, the mirror 133, a first image formation lens 134A, and a second image formation lens 134B. The microscope optical system 131 also comprises the dichroic mirror 124 which is also included in the illumination optical system 121. The objective lens 132 is located above the stage 101 on which the sample SA is placed so as to face the stage 101. The objective lens 132 condenses the excitation light from the light source 111 and illuminates the sample SA on the stage 101. The objective lens 132 receives fluorescence generated on the sample SA and converts it into parallel light.

The mirror 133 is, for example, configured using a half mirror having a ratio of transmittance to reflectance set to 1:1. A part of the fluorescence incident on the mirror 133 passes through the mirror 133 and enters the first image formation lens 134A. The fluorescence having passed through the first image formation lens 134A forms an image on a first image surface ImgA. The observer can observe an image of the sample SA formed on the first image surface ImgA, using the eyepiece 141. The other part of the fluorescence incident on the mirror 133 is reflected by the mirror 133 and enters the second image formation lens 134B. The fluorescence having passed through the second image formation lens 134B forms an image on a second image surface ImgB. At the second image surface ImgB is located an area sensor 152 of the imaging device 151.

Note that the mirror 133 is not limited to a half mirror but may be configured using an optical-path switching mirror capable of selectively switching the reflection direction of light. In this case, the mirror 133 reflects the fluorescence from the sample SA alternately toward one of the first image formation lens 134A and the second image formation lens 134B by switching.

The imaging device 151 comprises an image sensor 152. The image sensor 152 comprises an imaging device such as a CCD or a CMOS. The imaging device 151 is capable of capturing an image of the sample SA formed on the second image surface ImgB by using the image sensor 152.

In the fluorescence microscope 100 thus configured, the excitation light emitted from the light source 111 passes through the collimator lens 122 and becomes parallel light. The excitation light having passed through the collimator lens 122 passes through the excitation filter 123 and becomes incident on the dichroic mirror 124. The excitation light incident on the dichroic mirror 124 is reflected on the dichroic mirror 124 and passes through the objective lens 132. The excitation light having passed through the objective lens 132 is projected onto the sample SA on the stage 101. With this configuration, the illumination optical system 121 illuminates the sample SA on the stage 101 with the excitation light emitted from the light source 111.

The illumination with excitation light excites the fluorescent substances included in the sample SA, and fluorescence is emitted. Fluorescence from the sample SA passes through the objective lens 132 and becomes parallel light. The fluorescence having passed through the objective lens 132 becomes incident on the dichroic mirror 124. The fluorescence incident on the dichroic mirror 124 passes through the dichroic mirror 124, passes through the fluorescence filter 125, and becomes incident on the 33.

Part of the fluorescence incident on the mirror 133 passes through the mirror 133 and enters the first image formation lens 134A. The fluorescence having passed through the first image formation lens 134A forms an image on the first image surface ImgA. The other part of the fluorescence incident on the mirror 133 is reflected by the mirror 133 and enters the second image formation lens 134B. The fluorescence having passed through the second image formation lens 134B forms an image on the second image surface ImgB.

The observer observes an image of the sample SA formed on the first image surface ImgA, using the eyepiece 141. The imaging device 151 captures an image of the sample SA formed on the second image surface ImgB, using the image sensor 152. This fluorescence microscope 100 comprises the image formation lens IL of the microscope optical system according to the foregoing embodiment, as the first image formation lens 134A and the second image formation lens 134B. This fluorescence microscope 100 also comprises the objective lens OL of the microscope optical system according to the foregoing embodiment, as the objective lens 132. This makes it possible to provide a microscope device having a wide field of view and high resolution.

Note that in the case in which a field of view is wide, and the resolution is high, the amount of information on an image of the sample SA obtained by the imaging device 151 is large. To deal with it, use of a time delay integration (TDI) image sensor for the image sensor 152 makes it possible to obtain an image of the sample SA in a short time.

Figure 2:
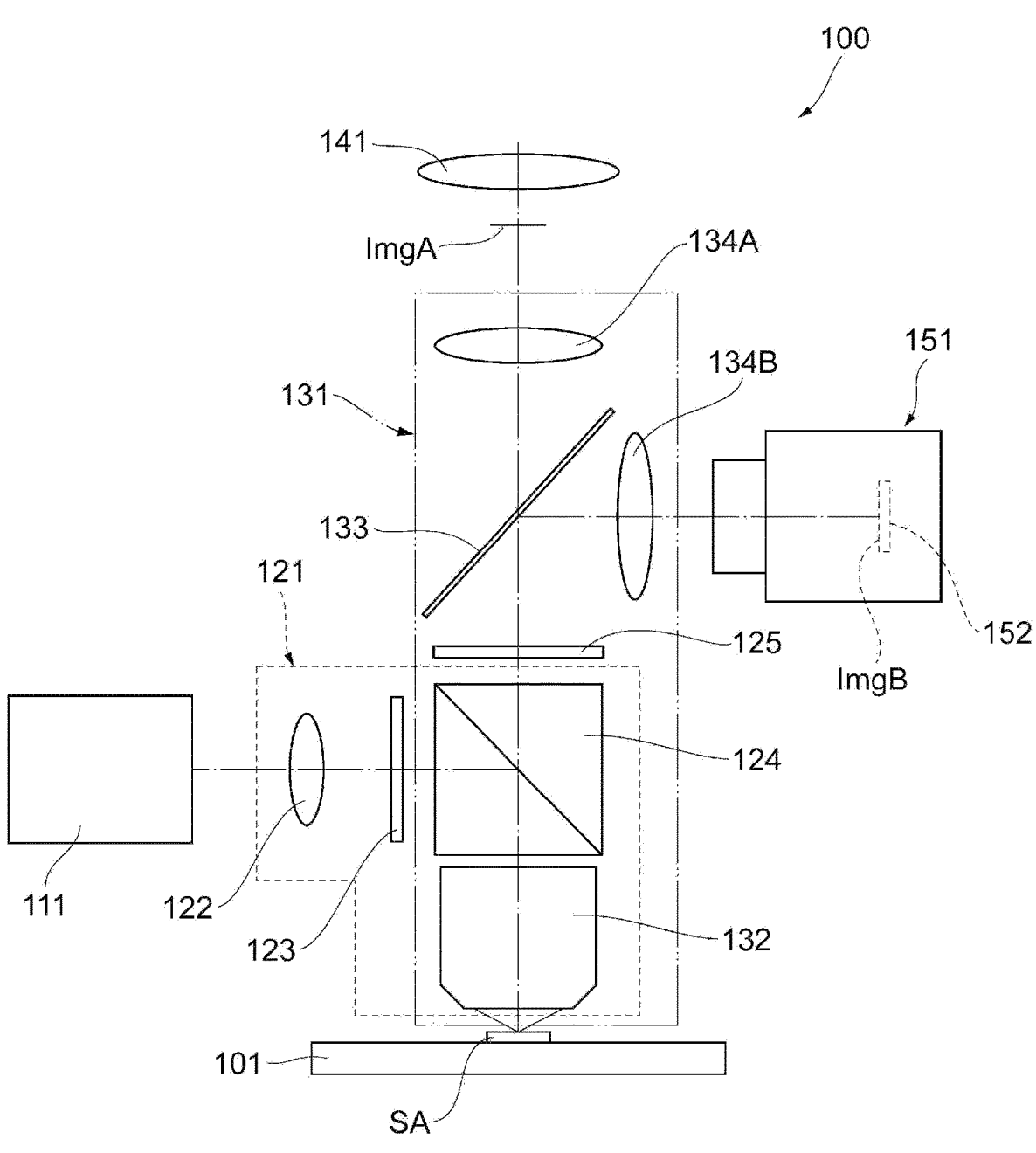
FIG. 2 is a schematic configuration diagram showing a fluorescence microscope which is an example of a microscope device.

The fluorescence microscope 100 has been described as an example of the microscope device according to the present embodiment, but the present disclosure is not limited to this example. For example, the microscope device according to the present embodiment may be a multiphoton excitation microscope, a light sheet microscope, a phase contrast microscope, a confocal microscope, a super resolution microscope, or the like. The fluorescence microscope 100 is not limited to an upright microscope as shown in FIG. 2 but may be an inverted microscope. With the present embodiment, as described above, it is possible to build microscope systems having various functions.

EXAMPLES

Hereinafter, examples of the image formation lens IL in the microscope optical system MOS according to the present embodiment will be described with reference to the drawings. The image formation lens IL according to each example is used in combination with an infinity-corrected objective lens OL to form a magnified image of an object. FIGS. 3, 5, 7, 9, 11, and 13 are cross-sectional diagrams showing the configurations of the image formation lenses IL (IL(1) to IL(6)) according to the first to sixth examples. In these FIGS. 3, 5, 7, 9, 11, and 13, each lens group is indicated by a combination of a symbol G and a number (or an alphabet), and each lens is indicated by a combination of a symbol L and a number (or an alphabet). In this case, to avoid cumbersome situations using many kinds of symbols and numbers and using large numbers, combinations of symbols and numbers are used independently in each example to indicate lenses or others. Thus, even if a combination of the same symbol and number are used in some of the examples, it does not mean the same constituent.

Below are shown Tables 1 to 6, in which Table 1 shows the specification data on the first example, Table 2 on the second example, Table 3 on the third example, Table 4 on the fourth example, Table 5 on the fifth example, and Table 6 on the sixth example. In each example, to calculate aberration characteristics, d-line (wavelength $\lambda=587.6$ nm), g-line (wavelength $\lambda=435.8$ nm), C-line (wavelength $\lambda=656.3$ nm), and F-line (wavelength $\lambda=486.1$ nm) are selected.

In the table of [General Data], f represents the focal length of the image formation lens IL. The symbol $\Phi$en represents the pupil diameter of the objective lens OL. The symbol $\Phi$im represents the diameter of the image circle in which the light from the image formation lens IL forms an image. The symbol $\Phi1$max represents the effective diameter of the lens with the largest effective diameter in the first lens group G1. The symbol f1 represents the focal length of the first lens group G1. TL represents the entire length of the image formation lens IL. The symbol h1 represents the height of the principal ray that enters the first lens group G1. The symbol h2 represents the height of the principal ray that enters the second lens group G2.

In the table of [Lens Data], the surface number indicates the order of the lens surface from the object side, R indicates the curvature radius corresponding to each surface number (R has a positive value if the lens surface is convex toward the object), D indicates the lens thickness or the air gap on the optical axis, corresponding to each surface number, nd indicates the refractive index of the optical material corresponding to the surface number at &-line (wavelength λ=587.6 nm), and vd indicates the Abbe number of the optical material corresponding to each surface number based on d-line. The symbol "m" in the curvature radius indicates a fat surface or an opening. Mentioning that the refractive index of air nd=1.00000 is omitted.

In all the specification values below, the unit of the focal length f, curvature radius R, surface distance D, other lengths, and the like listed is generally "mm" unless otherwise specified. However, the unit is not limited to this one because the same or similar optical performance can be obtained even if an optical system is proportionally enlarged or proportionally reduced in size.

The explanation on the tables up to this point is common in all of the examples, and hence repetitive description will be omitted below.

First Example

Figure 3:
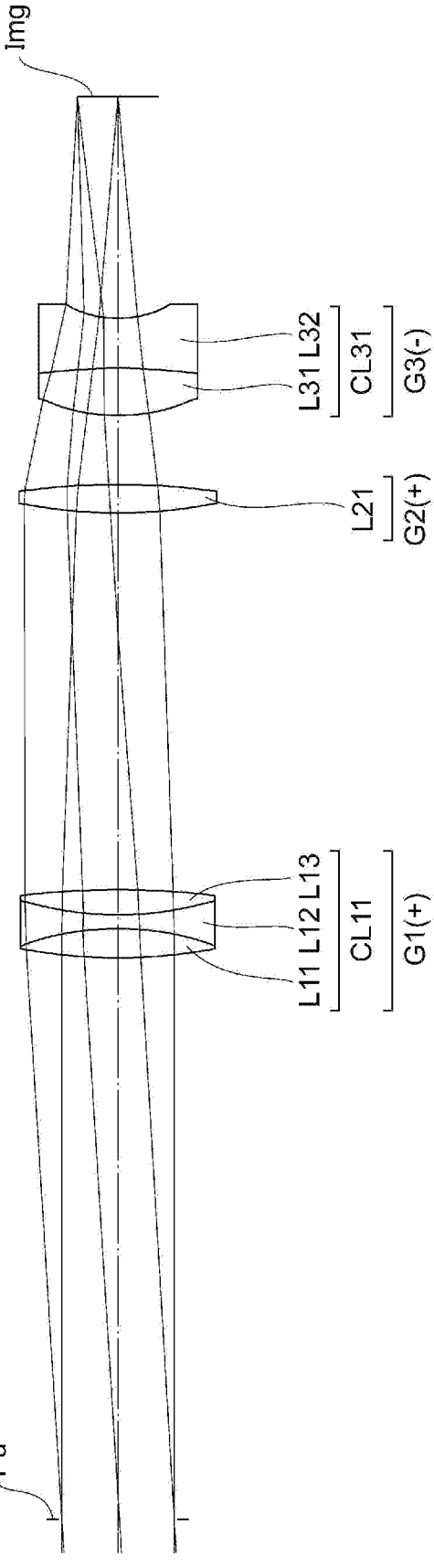
FIG. 3 is a cross-sectional diagram showing the configuration of an image formation lens according to a first example.

A first example will be described with reference to FIGS. 3 and 4 and Table 1. FIG. 3 is a cross-sectional diagram showing the configuration of an image formation lens according to the first example. The image formation lens IL(1) according to the first example comprises, in order from the object side along the optical axis, a first lens group G1 having positive refractive power, a second lens group G2 having positive refractive power, and a third lens group G3 having negative refractive power.

The first lens group G1 comprises a cemented lens CL11 having, in order from the object side, a biconvex positive lens L11, a biconcave negative lens L12, and a biconvex positive lens L13 joined together. The positive lens L11 of the first lens group G1 (or the positive lens L13) corresponds to a first positive lens in the present embodiment. The negative lens L12 of the first lens group G1 corresponds to a negative lens in the present embodiment.

The second lens group G2 comprises a biconvex positive lens L21. The positive lens L21 of the second lens group G2 corresponds to a second positive lens in the present embodiment.

The third lens group G3 comprises a cemented lens CL31 having, in order from the object side, a biconvex positive lens L31 and a biconcave negative lens L32 joined together. The image surface Img is located on the image side of the third lens group G3. Note that the entrance pupil surface Pu of the image formation lens IL(1) corresponds to the exit pupil surface of the infinity-corrected objective lens OL.

The following Table 1 shows the specification values of the image formation lens according to the first example. Note that the surface of surface number 1 indicates the entrance pupil surface of the image formation lens (in other words, the surface corresponding to the exit pupil surface of the objective lens).

TABLE 1

| [General Data] | | | |
|---|---|---|---|
| f = 200.0 | | | |
| Φen = 35.0 | | | |
| Φim = 25.0 | | | |
| Φ1max = 56.5 | | | |
| f1 = 430.9 | | | |
| TL = 255.5 | | | |
| h1 = 10.6 | | | |
| h2 = 15.4 | | | |

| [Lens Data] | | | |
|---|---|---|---|
| Surface Number | R | D | nd | vd |
|---|---|---|---|---|
| 1 | ∞ | 170.00 | | |
| 2 | 143.588 | 8.80 | 1.4560 | 91.36 |
| 3 | −94.993 | 4.00 | 1.5638 | 60.71 |
| 4 | 89.827 | 7.60 | 1.4560 | 91.36 |
| 5 | −309.677 | 114.10 | | |
| 6 | 116.697 | 8.50 | 1.6477 | 33.73 |
| 7 | −363.426 | 21.00 | | |
| 8 | 56.818 | 9.30 | 1.5725 | 57.30 |
| 9 | −208.394 | 15.20 | 1.7380 | 32.33 |
| 10 | 33.862 | 67.04 | | |

Figure 4:
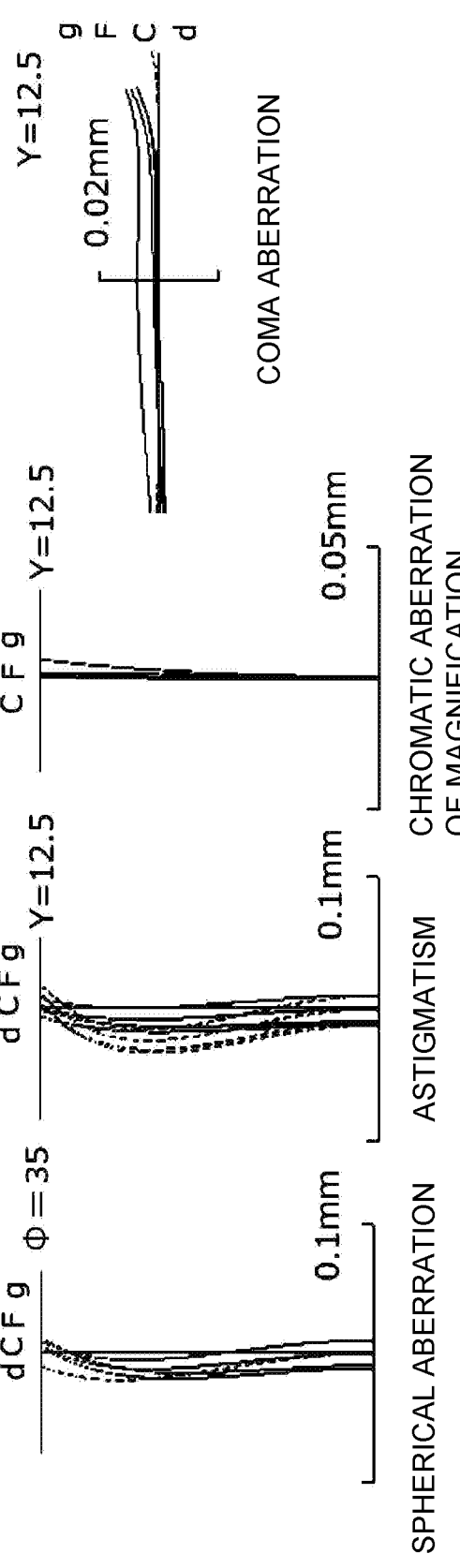
FIG. 4 is a diagram showing several kinds of aberration of the image formation lens according to the first example.

FIG. 4 is a diagram showing several kinds of aberration (spherical aberration, astigmatism, chromatic aberration of magnification, and coma aberration) of an image formation lens according to the first example. In each aberration diagram in FIG. 4, represents the pupil diameter (the entrance pupil diameter of the image formation lens, in other words, the exit pupil diameter of the objective lens), and Y represents the image height, and d indicates the aberration at d-line (wavelength λ=587.6 nm), g at g-line (wavelength λ=435.8 nm), C at C-line (wavelength λ=656.3 nm), and F at F-line (wavelength λ=486.1 nm). In the spherical aberration diagram, the vertical axis represents the normalized value with the maximum value of the pupil diameter set to 1, and the horizontal axis represents the aberration value [mm] of each ray. In the astigmatism diagram, a solid line represents the meridional image surface for each wavelength, and a dashed line represents the sagittal image surface for each wavelength. In the astigmatism diagram, the vertical axis represents the image height [mm], and the horizontal axis represents the aberration value [mm]. In the diagram of chromatic aberration of magnification, the vertical axis represents the image height [mm], and the horizontal axis represents the aberration value [mm]. The coma aberration diagram shows the aberration value [mm] in the case in which the image height Y is 12.5 mm. Note that the aberration diagrams of each example shown below use the same symbols as those in this example, and hence, repetitive description is omitted.

The aberration diagrams show that each aberration is favorably corrected in the image formation lens according to the first example even in the case of a large pupil diameter (numerical aperture NA), and that thus the image formation lens according to the first example has excellent image-forming performance.

Second Example

Figure 5:
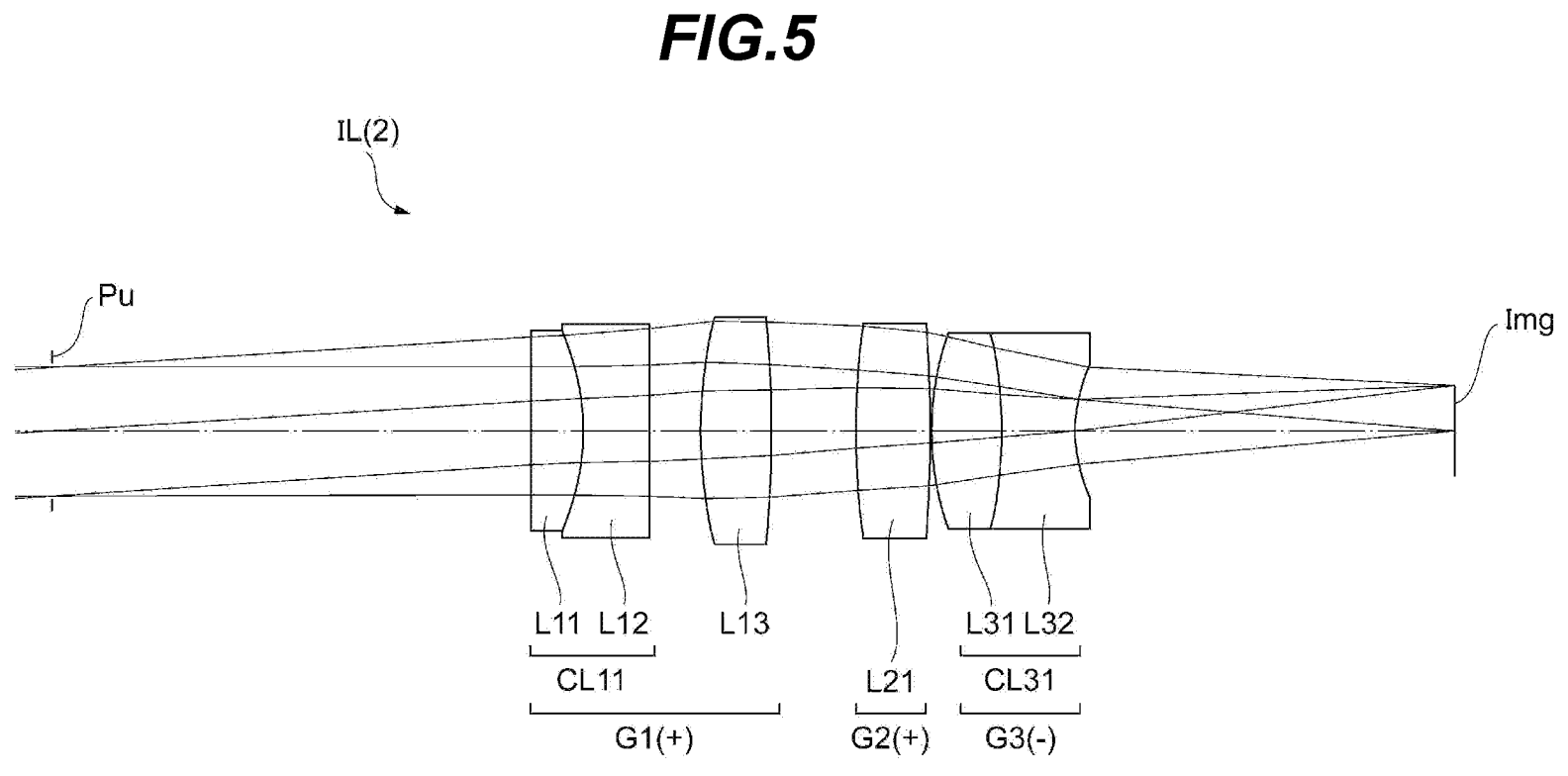

A second example will be described with reference to FIGS. 5 and 6 and Table 2. FIG. 5 is a cross-sectional diagram showing the configuration of an image formation lens according to the second example. The image formation lens IL(2) according to the second example comprises, in order from the object side along the optical axis, a first lens group G1 having positive refractive power, a second lens group G2 having positive refractive power, and a third lens group G3 having negative refractive power.

The first lens group G1 comprises, in order from the object side, a cemented lens CL11 having a biconvex positive lens L11 and a negative meniscus lens L12 with the concave surface on the object side, joined together and a biconvex positive lens L13. The positive lens L11 of the first lens group G1 corresponds to a first positive lens in the present embodiment. The negative meniscus lens L12 of the first lens group G1 corresponds to a negative lens in the present embodiment.

The second lens group G2 comprises a biconvex positive lens L21. The positive lens L21 of the second lens group G2 corresponds to a second positive lens in the present embodiment.

The third lens group G3 comprises a cemented lens CL31 having, in order from the object side, a biconvex positive lens L31 and a biconcave negative lens L32 joined together. The image surface Img is located on the image side of the third lens group G3. Note that the entrance pupil surface Pu of the image formation lens IL(2) corresponds to the exit pupil surface of the infinity-corrected objective lens OL.

The following Table 2 shows the specification values of the image formation lens according to the second example. Note that the surface of surface number 1 indicates the entrance pupil surface of the image formation lens (in other words, the surface corresponding to the exit pupil surface of the objective lens).

TABLE 2

| [General Data] | | | |
|---|---|---|---|
| f = 200.0 | | | |
| Φen = 35.0 | | | |
| Φim = 25.0 | | | |
| Φ1max = 59.4 | | | |
| f1 = 258.7 | | | |
| TL = 250.5 | | | |
| h1 = 8.1 | | | |
| h2 = 11.5 | | | |

| [Lens Data] | | | | |
|---|---|---|---|---|
| Surface Number | R | D | nd | νd |
| 1 | ∞ | 130.00 | | |
| 2 | 1828.100 | 14.00 | 1.4978 | 82.57 |
| 3 | −66.700 | 18.00 | 1.6700 | 47.14 |
| 4 | −1762.800 | 14.00 | | |
| 5 | 139.800 | 19.00 | 1.5691 | 71.31 |
| 6 | −384.900 | 23.00 | | |
| 7 | 219.500 | 20.00 | 1.7552 | 27.57 |
| 8 | −438.500 | 0.50 | | |
| 9 | 80.200 | 19.00 | 1.4978 | 82.57 |
| 10 | −118.800 | 20.00 | 1.6541 | 39.68 |
| 11 | 42.700 | 103.01 | | |

Figure 6:
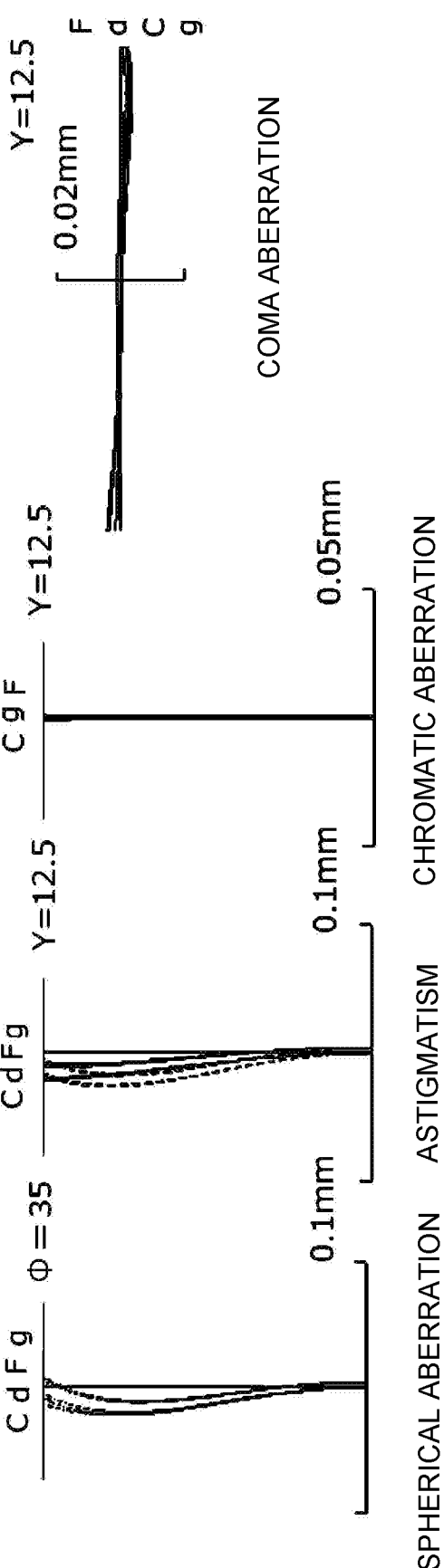
FIG. 6 is a diagram showing several kinds of aberration of the image formation lens according to the second example.

FIG. 6 is a diagram showing several kinds of aberration of an image formation lens according to the second example (spherical aberration, astigmatism, chromatic aberration of magnification, and coma aberration). The aberration diagrams show that each aberration is favorably corrected in the image formation lens according to the second example even in the case of a large pupil diameter (numerical aperture NA), and that thus the image for n lens according to the second example has excellent image-forming performance.

Third Example

Figure 7:
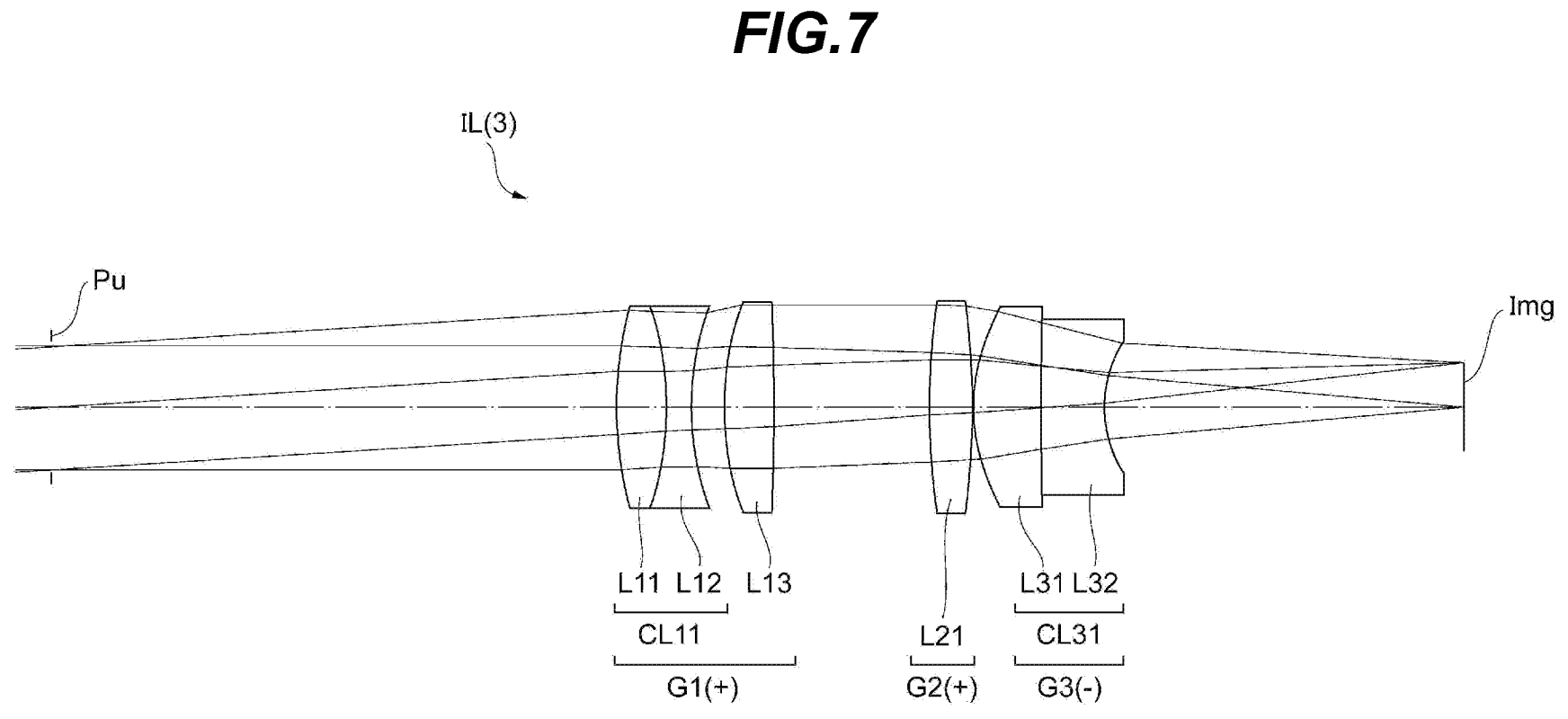

A third example will be described with reference to FIGS. 7 and 8 and Table 3. FIG. 7 is a cross-sectional diagram showing the configuration of an image formation lens according to the third example. The image formation lens IL(3) according to the third example comprises, in order from the object side along the optical axis, a first lens group G1 having positive refractive power, a second lens group G2 having positive refractive power, and a third lens group G3 having negative refractive power.

The first lens group G1 comprises, in order from the object side, a cemented lens CL11 having a biconvex positive lens L11 and a biconcave negative lens L12 joined together and a biconvex positive lens L13. The positive lens L11 of the first lens group G1 corresponds to a first positive lens in the present embodiment. The negative lens L12 of the first lens group G1 corresponds to a negative lens in the present embodiment.

The second lens group G2 comprises a biconvex positive lens L21. The positive lens L21 of the second lens group G2 corresponds to a second positive lens in the present embodiment.

The third lens group G3 comprises a cemented lens CL31 having, in order from the object side, a positive meniscus lens L31 with the convex surface on the object side and a negative meniscus lens L32 with the convex surface on the object side, joined together. The image surface Img is located on the image side of the third lens group G3. Note that the entrance pupil surface Pu of the image formation lens IL(3) corresponds to the exit pupil surface of the infinity-corrected objective lens OL.

The following Table 3 shows the specification values of the image formation lens according to the third example. Note that the surface of surface number 1 indicates the entrance pupil surface of the image formation lens (in other words, the surface corresponding to the exit pupil surface of the objective lens).

TABLE 3

| [General Data] | | | |
|---|---|---|---|
| f = 200.0 | | | |
| Φen = 35.0 | | | |
| Φim = 25.0 | | | |
| Φ1max = 58.6 | | | |
| f1 = 469.6 | | | |
| TL = 239.4 | | | |
| h1 = 10.0 | | | |
| h2 = 13.5 | | | |

| [Lens Data] | | | | |
|---|---|---|---|---|
| Surface Number | R | D | nd | νd |
| 1 | ∞ | 160.00 | | |
| 2 | 119.600 | 14.00 | 1.4978 | 82.57 |
| 3 | −87.800 | 7.00 | 1.6074 | 56.74 |
| 4 | 83.680 | 9.50 | | |
| 5 | 92.190 | 14.00 | 1.4978 | 82.57 |
| 6 | −665.190 | 44.00 | | |
| 7 | 227.200 | 12.00 | 1.6477 | 33.73 |
| 8 | −235.400 | 0.50 | | |
| 9 | 57.790 | 19.00 | 1.4978 | 82.57 |
| 10 | 1369.400 | 18.00 | 1.6730 | 38.15 |
| 11 | 36.760 | 101.44 | | |

Figure 8:
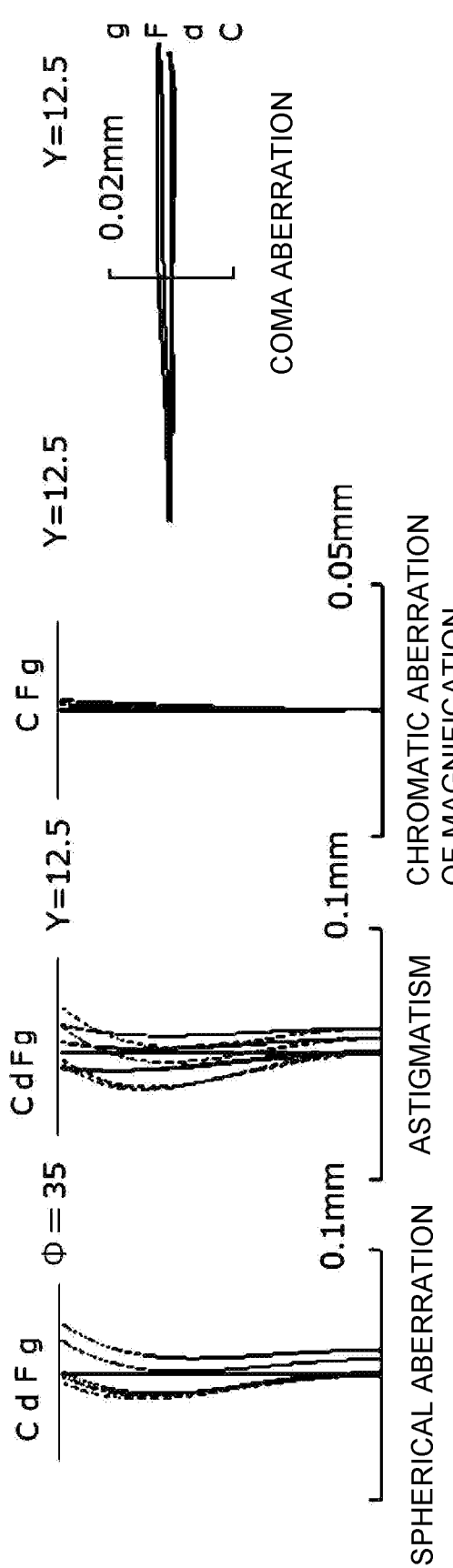
FIG. 8 is a diagram showing several kinds of aberration of the image formation lens according to the third example.

FIG. 8 is a diagram showing several kinds of aberration of an image formation lens according to the third example (spherical aberration, astigmatism, chromatic aberration of magnification, and coma aberration). The aberration diagrams show that each aberration is favorably corrected in the image formation lens according to the third example even in the case of a large pupil diameter (numerical aperture NA), and that thus the image formation lens according to the third example has excellent image-forming performance.

Fourth Example

Figure 9:
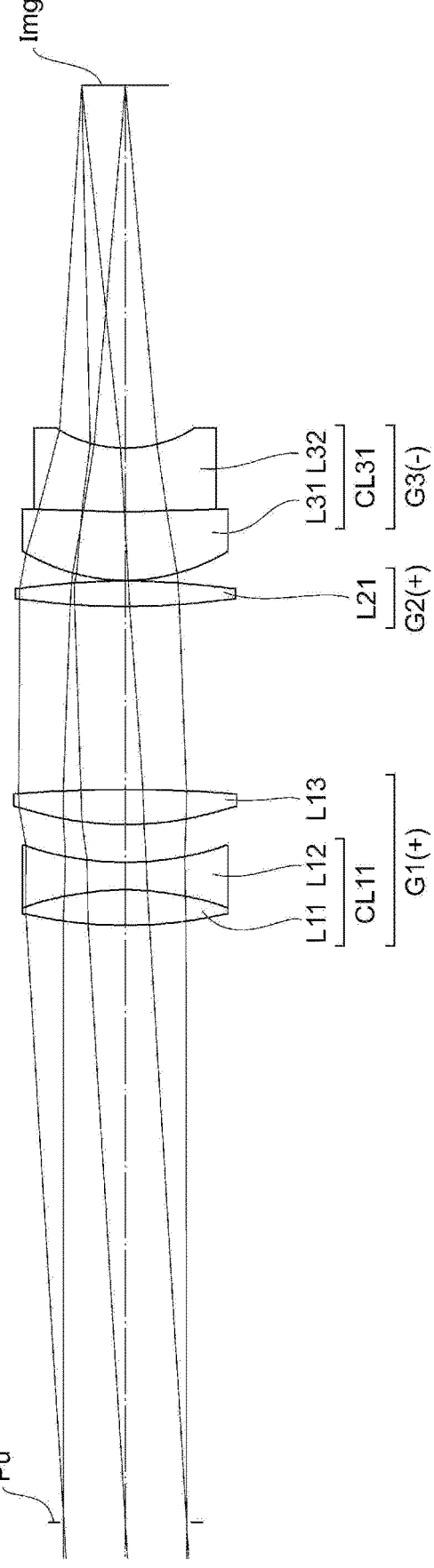
FIG. 9 is a cross-sectional diagram showing the configuration of an image formation lens according to a fourth example.

A fourth example will be described with reference to FIGS. 9 and 10 and Table 4. FIG. 9 is a cross-sectional diagram showing the configuration of an image formation lens according to the fourth example. The image formation lens IL(4) according to the fourth example comprises, in order from the object side along the optical axis, a first lens group G1 having positive refractive power, a second lens group G2 having positive refractive power, and a third lens group G3 having negative refractive power.

The first lens group G1 comprises, in order from the object side, a cemented lens CL11 having a biconvex positive lens L11 and a biconcave negative lens L12 joined together and a biconvex positive lens L13. The positive lens L11 of the first lens group G1 corresponds to a first positive lens in the present embodiment. The negative lens L12 of the first lens group G1 corresponds to a negative lens in the present embodiment.

The second lens group G2 comprises a biconvex positive lens L21. The positive lens L21 of the second lens group G2 corresponds to a second positive lens in the present embodiment.

The third lens group G3 comprises a cemented lens CL31 having, in order from the object side, a positive meniscus lens L31 with the convex surface on the object side and a negative meniscus lens L32 with the convex surface on the object side, joined together. The image surface Img is located on the image side of the third lens group G3. Note that the entrance pupil surface Pu of the image formation lens IL(4) corresponds to the exit pupil surface of the infinity-corrected objective lens OL.

The following Table 4 shows the specification values of the image formation lens according to the fourth example. Note that the surface of surface number 1 indicates the entrance pupil surface of the image formation lens (in other words, the surface corresponding to the exit pupil surface of the objective lens).

TABLE 4

| [General Data] |
| --- | f = 200.0
Φen = 35.0
Φim = 25.0
Φ1max = 60.8
f1 = 448.0
TL = 239.4
h1 = 10.6
h2 = 14.2

| [Lens Data] | | | | |
| --- | --- | --- | --- | --- |
| Surface Number | R | D | nd | vd |
| 1 | ∞ | 170.00 | | |
| 2 | 132.330 | 10.00 | 1.4978 | 82.57 |
| 3 | −85.600 | 8.00 | 1.6127 | 58.54 |
| 4 | 92.390 | 10.74 | | |
| 5 | 101.480 | 10.00 | 1.4978 | 82.57 |
| 6 | −402.800 | 52.20 | | |
| 7 | 237.210 | 7.00 | 1.6259 | 35.72 |
| 8 | −242.470 | 0.50 | | |
| 9 | 57.060 | 19.50 | 1.4978 | 82.57 |
| 10 | 554.550 | 18.00 | 1.6730 | 38.15 |
| 11 | 36.660 | 103.44 | | |

Figure 10:
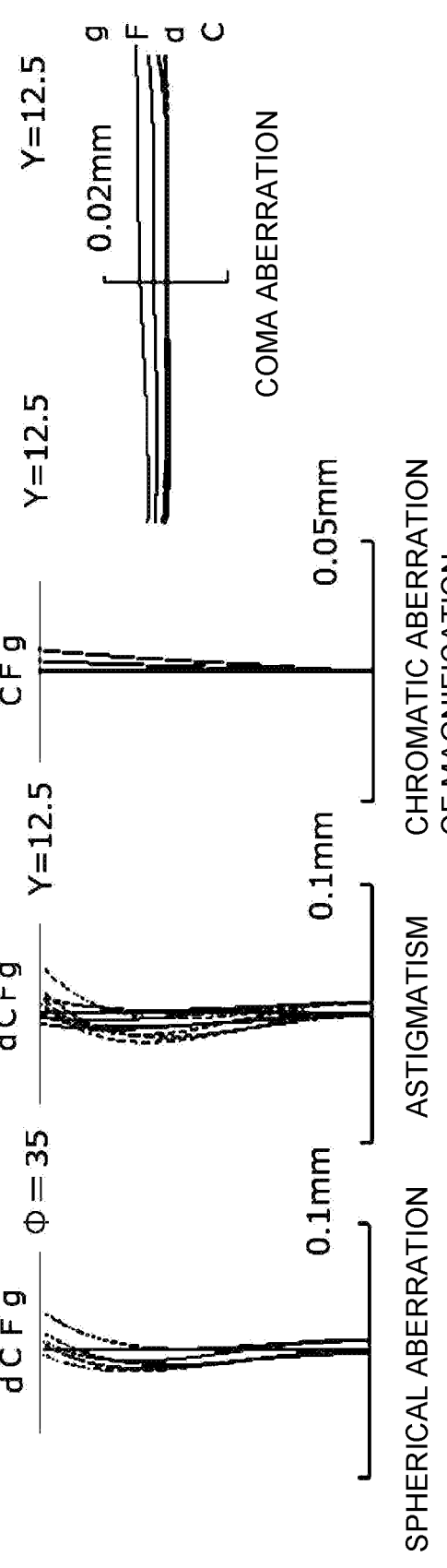
FIG. 10 is a diagram showing several kinds of aberration of the image formation lens according to the fourth example.

FIG. 10 is a diagram showing several kinds of aberration of an image formation lens according to the fourth example (spherical aberration, astigmatism, chromatic aberration of magnification, and coma aberration). The aberration diagrams show that each aberration is favorably corrected in the image formation lens according to the fourth example even in the case of a large pupil diameter (numerical aperture NA), and that thus the image formation lens according to the fourth example has excellent image-forming performance.

Fifth Example

Figure 11:
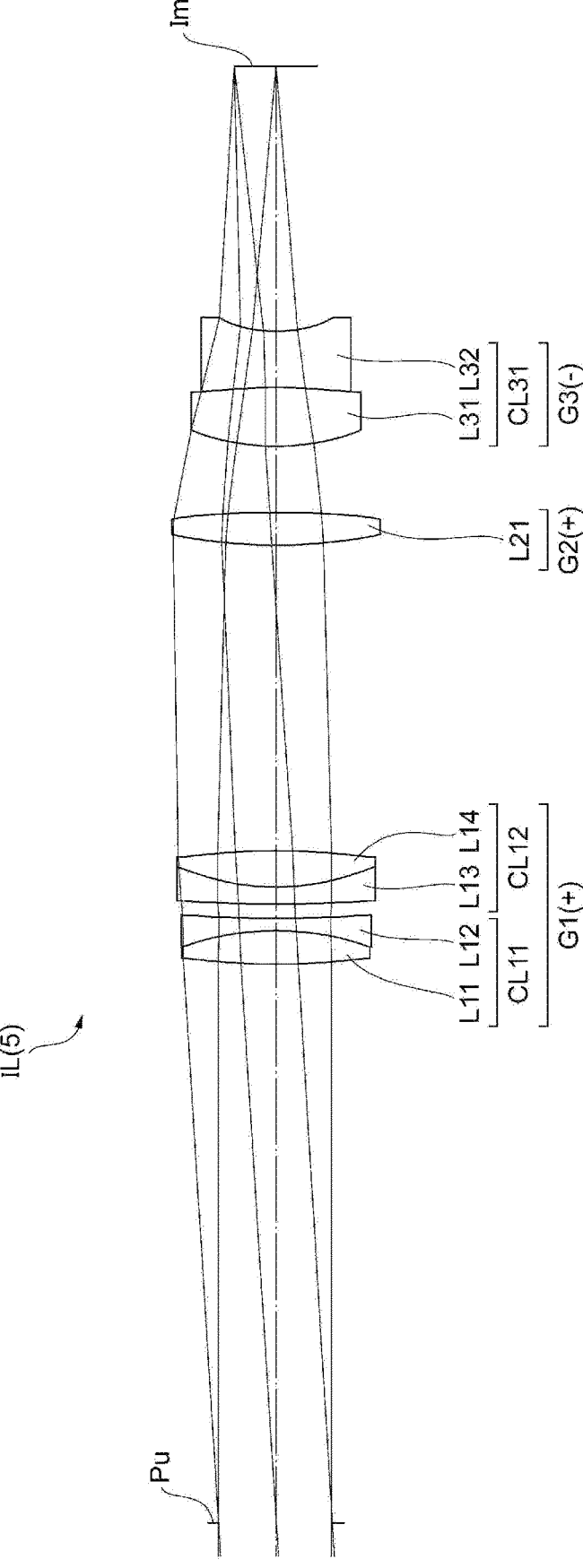
FIG. 11 is a cross-sectional diagram showing the configuration of an image formation lens according to a fifth example.

A fifth example will be described with reference to FIGS. 11 and 12 and Table 5. FIG. 11 is a cross-sectional diagram showing the configuration of an image formation lens according to the fifth example. The image formation lens IL(5) according to the fifth example comprises, in order from the object side along the optical axis, a first lens group G1 having positive refractive power, a second lens group G2 having positive refractive power, and a third lens group G3 having negative refractive power.

The first lens group G1 comprises, in order from the object side, a first cemented lens CL11 having a biconvex positive lens L11 and a biconcave negative lens L12 joined together and a second cemented lens CL12 having a negative meniscus lens L13 with the convex surface on the object side and a biconvex positive lens L14 joined together. The positive lens L11 of the first lens group G1 corresponds to a first positive lens in the present embodiment. The negative lens L12 of the first lens group G1 corresponds to a negative lens in the present embodiment.

The second lens group G2 comprises a biconvex positive lens L21. The positive lens L21 of the second lens group G2 corresponds to a second positive lens in the present embodiment.

The third lens group G3 comprises a cemented lens CL31 having, in order from the object side, a biconvex positive lens L31 and a biconcave negative lens L32 joined together. The image surface Img is located on the image side of the third lens group G3. Note that the entrance pupil surface Pu of the image formation lens IL(5) corresponds to the exit pupil surface of the infinity-corrected objective lens OL.

The following Table 5 shows the specification values of the image formation lens according to the fifth example. Note that the surface of surface number 1 indicates the entrance pupil surface of the image formation lens (in other words, the surface corresponding to the exit pupil surface of the objective lens).

TABLE 5

| [General Data] |
| --- | f = 200.0
Φen = 35.0
Φim = 25.0
Φ1max = 59.3
f1 = 625.5
TL = 272.7
h1 = 10.6
h2 = 16.1

| [Lens Data] | | | | |
| --- | --- | --- | --- | --- |
| Surface Number | R | D | nd | vd |
| 1 | ∞ | 170.00 | | |
| 2 | 231.728 | 10.00 | 1.4560 | 91.36 |
| 3 | −87.077 | 4.00 | 1.6228 | 57.10 |
| 4 | 463.433 | 4.35 | | |
| 5 | 530.860 | 5.00 | 1.5168 | 64.14 |
| 6 | 72.310 | 11.00 | 1.4978 | 82.57 |
| 7 | −231.728 | 93.00 | | |
| 8 | 153.222 | 10.00 | 1.6477 | 33.73 |
| 9 | −273.210 | 20.00 | | |
| 10 | 66.741 | 18.00 | 1.5891 | 61.22 |

TABLE 5-continued

| 11 | −201.935 | 17.00 | 1.7380 | 32.33 |
|----|----------|-------|--------|-------|
| 12 | 38.634 | 80.39 | | |

Figure 12:
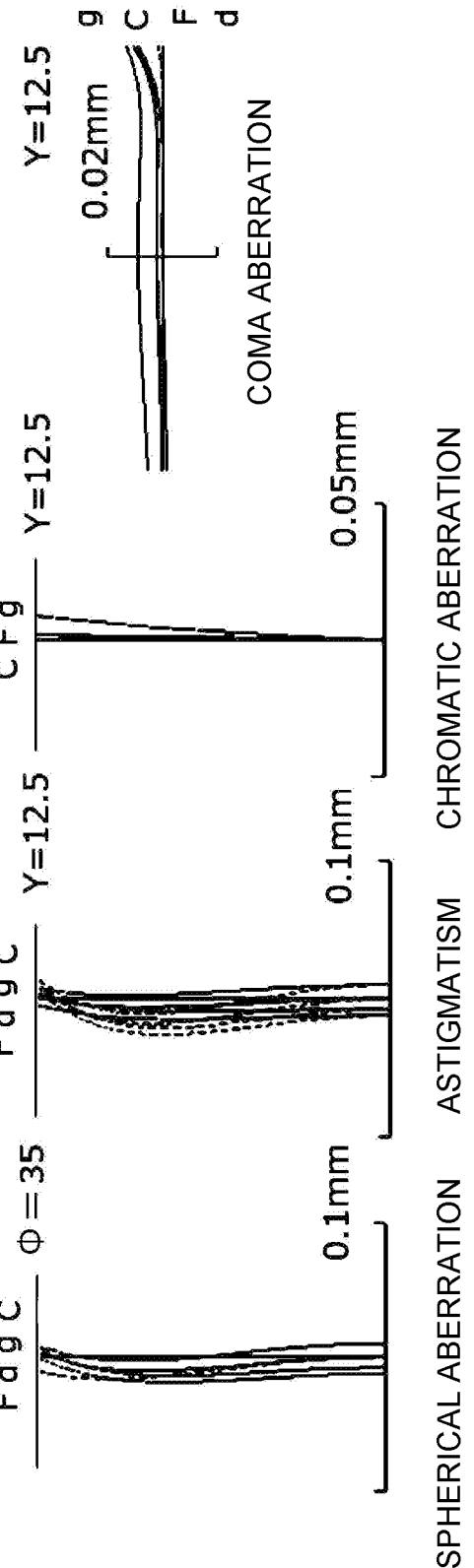
FIG. 12 is a diagram showing several kinds of aberration of the image formation lens according to the fifth example.

FIG. 12 is a diagram showing several kinds of aberration of an image formation lens according to the fifth example (spherical aberration, astigmatism, chromatic aberration of magnification, and coma aberration). The aberration diagrams show that each aberration is favorably corrected in the image formation lens according to the fifth example even in the case of a large pupil diameter (numerical aperture NA), and that thus the image formation lens according to the fifth example has excellent image-forming performance.

Sixth Example

Figure 13:
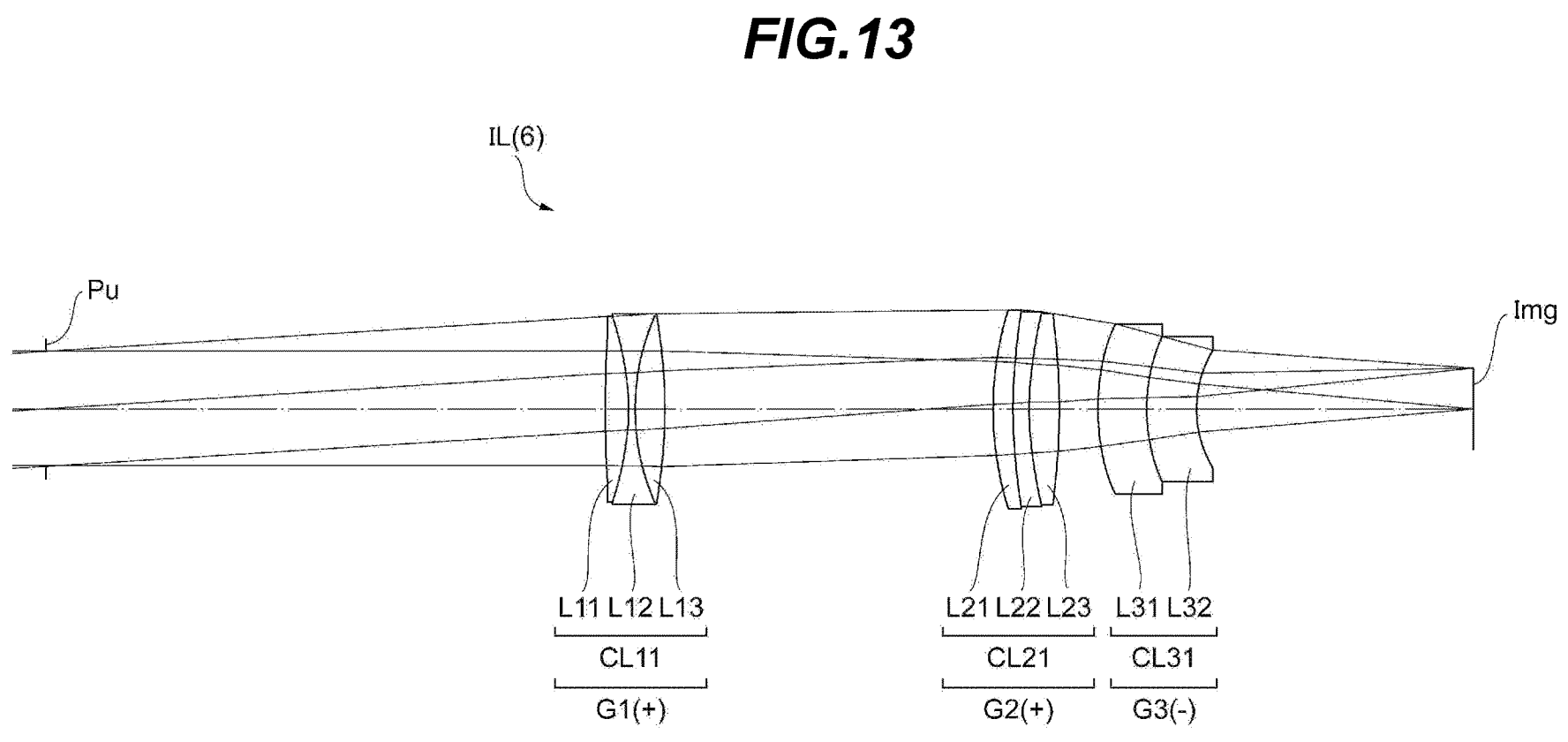

A sixth example will be described with reference to FIGS. 13 and 14 and Table 6. FIG. 13 is a cross-sectional diagram showing the configuration of an image formation lens according to the sixth example. The image formation lens IL(6) according to the sixth example comprises, in order from the object side along the optical axis, a first lens group G1 having positive refractive power, a second lens group G2 having positive refractive power, and a third lens group G3 having negative refractive power.

The first lens group G1 comprises a cemented lens CL11 having, in order from the object side, a biconvex positive lens L11, a biconcave negative lens L12, and a biconvex positive lens L13 joined together. The positive lens L11 of the first lens group G1 corresponds to a first positive lens in the present embodiment. The negative lens L12 of the first lens group G1 corresponds to a negative lens in the present embodiment. The positive lens L13 of the first lens group G1 corresponds to a second positive lens in the present embodiment.

The second lens group G2 comprises a cemented lens CL21 having, in order from the object side, a positive meniscus lens L21 with the convex surface on the object side, a negative meniscus lens L22 with the convex surface on the object side, and a biconvex positive lens L23, joined together.

The third lens group G3 comprises a cemented lens CL31 having, in order from the object side, a negative meniscus lens L31 with the convex surface on the object side and a negative meniscus lens L32 with the convex surface on the object side, joined together. The image surface Img is located on the image side of the third lens group G3. Note that the entrance pupil surface Pu of the image formation lens IL(6) corresponds to the exit pupil surface of the infinity-corrected objective lens OL.

The following Table 6 shows the specification values of the image formation lens according to the sixth example. Note that the surface of surface number 1 indicates the entrance pupil surface of the image formation lens (in other words, the surface corresponding to the exit pupil surface of the objective lens).

TABLE 6

[General Data]

f = 200.0
Φen = 35.0
Φim = 25.0
Φ1max = 57.7
f1 = 374.0
TL = 263.9

TABLE 6-continued h1 = 10.6
h2 = 15.4

[Lens Data]

| Surface Number | R | D | nd | vd |
|-----|---------|--------|--------|-------|
| 1 | ∞ | 170.00 | | |
| 2 | 408.401 | 7.00 | 1.4560 | 91.36 |
| 3 | −84.103 | 2.00 | 1.6134 | 44.27 |
| 4 | 68.057 | 9.00 | 1.5750 | 41.51 |
| 5 | −181.483 | 100.00 | | |
| 6 | 98.580 | 6.00 | 1.4560 | 91.36 |
| 7 | 166.731 | 5.00 | 1.6134 | 44.27 |
| 8 | 113.691 | 9.00 | 1.4560 | 91.36 |
| 9 | −256.750 | 11.72 | | |
| 10 | 64.312 | 15.00 | 1.4978 | 82.57 |
| 11 | 52.888 | 15.20 | 1.7380 | 32.33 |
| 12 | 33.548 | 83.96 | | |

Figure 14:
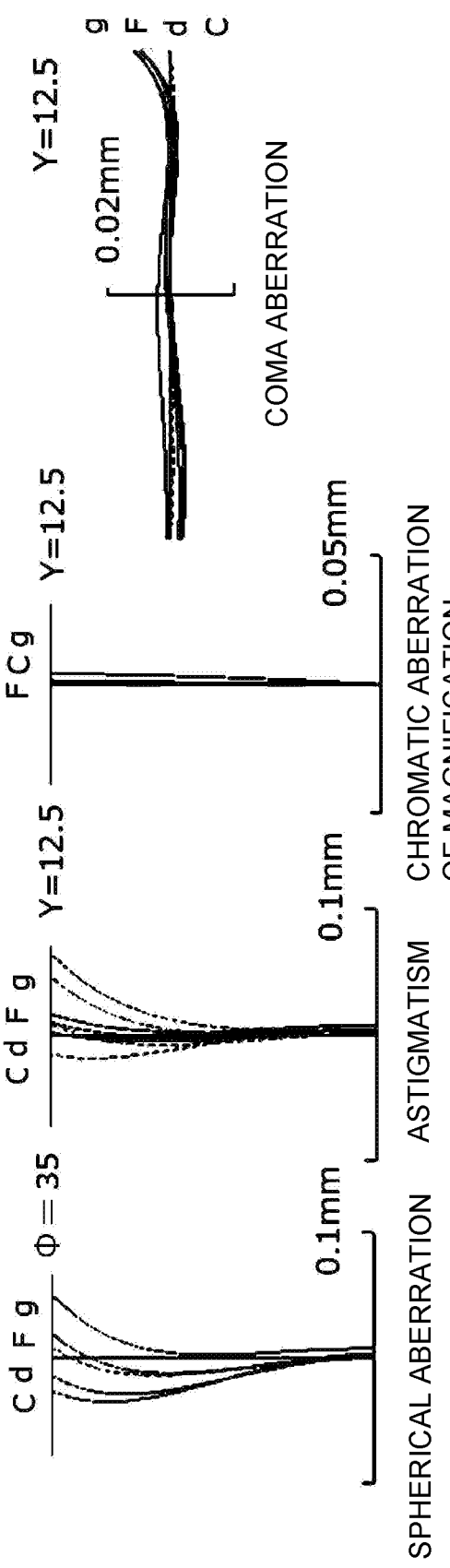
FIG. 14 is a diagram showing several kinds of aberration of the image formation lens according to the sixth example.

FIG. 14 is a diagram showing several kinds of aberration of an image formation lens according to the sixth example (spherical aberration, astigmatism, chromatic aberration of magnification, and coma aberration). The aberration diagrams show that each aberration is favorably corrected in the image formation lens according to the sixth example even in the case of a large pupil diameter (numerical aperture NA), and that thus the image formation lens according to the sixth example has excellent image-forming performance.

Next, the table of [Conditional Expression Corresponding Value] is shown below. This table shows the values corresponding to conditional expressions (1) to (8) for all examples (the first to sixth examples) together.

$0.1 < \Phi en/f < 0.2$   Conditional Expression (1)

$35 \text{ [mm]} < (\Phi en \times \Phi 1max)/\Phi im < 120 \text{ [mm]}$   Conditional Expression (2)

$vdp2 < vdn < vdp1$   Conditional Expression (3)

$70 < vdp1$   Conditional Expression (4)

$vdp2 < 45$   Conditional Expression (5)

$1.0 < |f1|/f$   Conditional Expression (6)

$1.0 < h2/h1$   Conditional Expression (7)

$0.7 < TL/f$   Conditional Expression (8)

[Conditional Expression Corresponding Value]

| Conditional Expression | First Example | Second Example | Third Example |
|-----|-------|-------|-------|
| (1) | 0.175 | 0.175 | 0.175 |
| (2) | 79.10 | 83.16 | 82.04 |
| (3)vdp1 | 91.36 | 82.50 | 82.57 |
| (3)vdn | 60.71 | 47.14 | 56.74 |
| (3)vdp2 | 33.73 | 27.57 | 33.72 |
| (4) | 91.36 | 82.50 | 82.57 |
| (5) | 33.73 | 27.57 | 33.72 |
| (6) | 2.15 | 1.29 | 2.35 |
| (7) | 1.45 | 1.42 | 1.35 |
| (8) | 1.28 | 1.25 | 1.20 |

| Conditional Expression | Fourth Example | Fifth Example | Sixth Example |
|-----|-------|-------|-------|
| (1) | 0.175 | 0.175 | 0.175 |
| (2) | 85.12 | 83.02 | 80.78 |
| (3)vdp1 | 82.57 | 91.36 | 91.36 |

-continued

| | | | |
|---|---|---|---|
| (3)vdn | 58.54 | 57.10 | 44.27 |
| (3)vdp2 | 35.72 | 33.73 | 41.51 |
| (4) | 82.57 | 91.36 | 91.36 |
| (5) | 35.72 | 33.73 | 41.51 |
| (6) | 2.24 | 3.13 | 1.87 |
| (7) | 1.34 | 1.52 | 1.45 |
| (8) | 1.20 | 1.36 | 1.32 |

With each of the above examples, it is possible to achieve an image formation lens and microscope optical system having a wide field of view and high resolution.

Here, the above examples are to show specific examples of the present embodiment, and hence the embodiment is not limited to these examples.

Although the first lens group G1 has positive refractive power in each of the above examples, the configuration is not limited to these examples, but the first lens group G1 may have negative refractive power. Specifically, since the first lens group G1 has weaker refractive power than the second lens group G2 and mainly has a function of correcting chromatic aberration, the first lens group G1 may have approximately no refractive power or may have weak negative refractive power.

EXPLANATION OF NUMERALS AND CHARACTERS

G1 first lens group
G2 second lens group
G3 third lens group
The invention claimed is:

1. A microscope optical system comprising:
an objective lens that converts light from an object into parallel light; and
an image formation lens that forms an image from the light from the objective lens, wherein
the image formation lens comprises, in order from an object side, a first lens group including a cemented lens, a second lens group having positive refractive power, and a third lens group having negative refractive power, and
wherein a conditional expression as follows is satisfied:

$$0.1 < \Phi en/f < 0.2.$$

where $\Phi en$ represents a pupil diameter of the objective lens, and
f represents a focal length of the image formation lens, wherein a conditional expression as follows is satisfied:

$$65 \text{ [mm]} < (\Phi en \times \Phi 1max)/\Phi im < 120 \text{ [mm]},$$

where $\Phi 1max$ represents an effective diameter of a lens having a largest effective diameter in the first lens group, and
$\Phi im$ represents a diameter of an image circle in which the light from the image formation lens forms the image.

2. The microscope optical system according to claim 1, wherein
the cemented lens of the first lens group comprises a first positive lens and a negative lens joined to the first positive lens, the first lens group or the second lens group comprises a second positive lens, and
a conditional expression as follows is satisfied:

$$vdp2 < vdn < vdp1,$$

where vdp1: the Abbe number of the first positive lens, vdp2: the Abbe number of the second positive lens, and vdn: the Abbe number of the negative lens.

3. The microscope optical system according to claim 2, wherein a conditional expression as follows is satisfied:

$$70 < vdp1.$$

4. The microscope optical system according to claim 2, wherein a conditional expression as follows is satisfied:

$$vdp2 < 45.$$

5. The microscope optical system according to claim 2, wherein a conditional expression as follows is satisfied:

$$1.0 < |f1|/f,$$

where f1: the focal length of the first lens group.

6. The microscope optical system according to claim 2, wherein a conditional expression as follows is satisfied:

$$1.0 < h2/h1,$$

where h1 represents a height of a principal ray that enters the first lens group, and
h2 represents a height of the principal ray that enters the second lens group.

7. The microscope optical system according to claim 2, wherein a conditional expression as follows is satisfied:

$$0.7 < TL/f,$$

where TL represents an entire length of the image formation lens.

8. A microscope device comprising the microscope optical system according to claim 2.

9. An image formation lens for a microscope, the image formation lens forming an image from light from an objective lens, the image formation lens comprising:
in order from an object side, a first lens group including a cemented lens; a second lens group having positive refractive power; and a third lens group having negative refractive power, wherein
a conditional expression as follows is satisfied:

$$0.1 < \Phi en/f < 0.2,$$

where $\Phi en$ represents a pupil diameter of the objective lens, and
f represents a focal length of the image formation lens, wherein a conditional expression as follows satisfied:

$$65 \text{ [mm]} < (\Phi en \times \Phi 1max)/\Phi im < 120 \text{ [mm]},$$

where $\Phi 1max$ represents an effective diameter of a lens having a largest effective diameter in the first lens group, and
$\Phi im$ represents a diameter of an image circle in which the light from the image formation lens forms the image.

* * * * *